United States Patent [19]
Taylor

[11] Patent Number: 5,107,886
[45] Date of Patent: Apr. 28, 1992

[54] CONSTANT FLOW ORIFICE VALVE

[76] Inventor: Julian S. Taylor, 8300 SW 8th, Oklahoma City, Okla. 73128

[21] Appl. No.: 656,278

[22] Filed: Feb. 15, 1991

[51] Int. Cl.⁵ ............................................. G05D 7/01
[52] U.S. Cl. ..................................... 137/501; 251/208
[58] Field of Search ................ 137/501, 503; 251/208

[56] References Cited

U.S. PATENT DOCUMENTS

| | | | |
|---|---|---|---|
| 2,272,684 | 2/1942 | Vickers | 137/501 X |
| 2,916,047 | 12/1959 | Butcher | 137/501 |
| 4,700,928 | 10/1987 | Marty | 251/208 X |

FOREIGN PATENT DOCUMENTS 742885 6/1980 U.S.S.R. ............................. 137/501
26615 of 1912 United Kingdom ............... 137/501

Primary Examiner—Robert G. Nilson
Attorney, Agent, or Firm—Robert K. Rhea

[57] ABSTRACT

A disc orifice valve for providing a constant volume of fluid flowing through a high pressure fluid line is formed by a valve body having in-line inlet and outlet ports. Dual bores in the valve body transversely intersecting the fluid flow passageway between the inlet and outlet ports respectively receive multiple orifice discs for controlling the volume of fluid entering the valve and a poppet valve assembly controlled by a diaphragm fluid pressure balanced on its opposite sides maintaining the poppet valve in an open position in accordance with the volume of fluid at the inlet port and biased open by spring pressure.

6 Claims, 3 Drawing Sheets

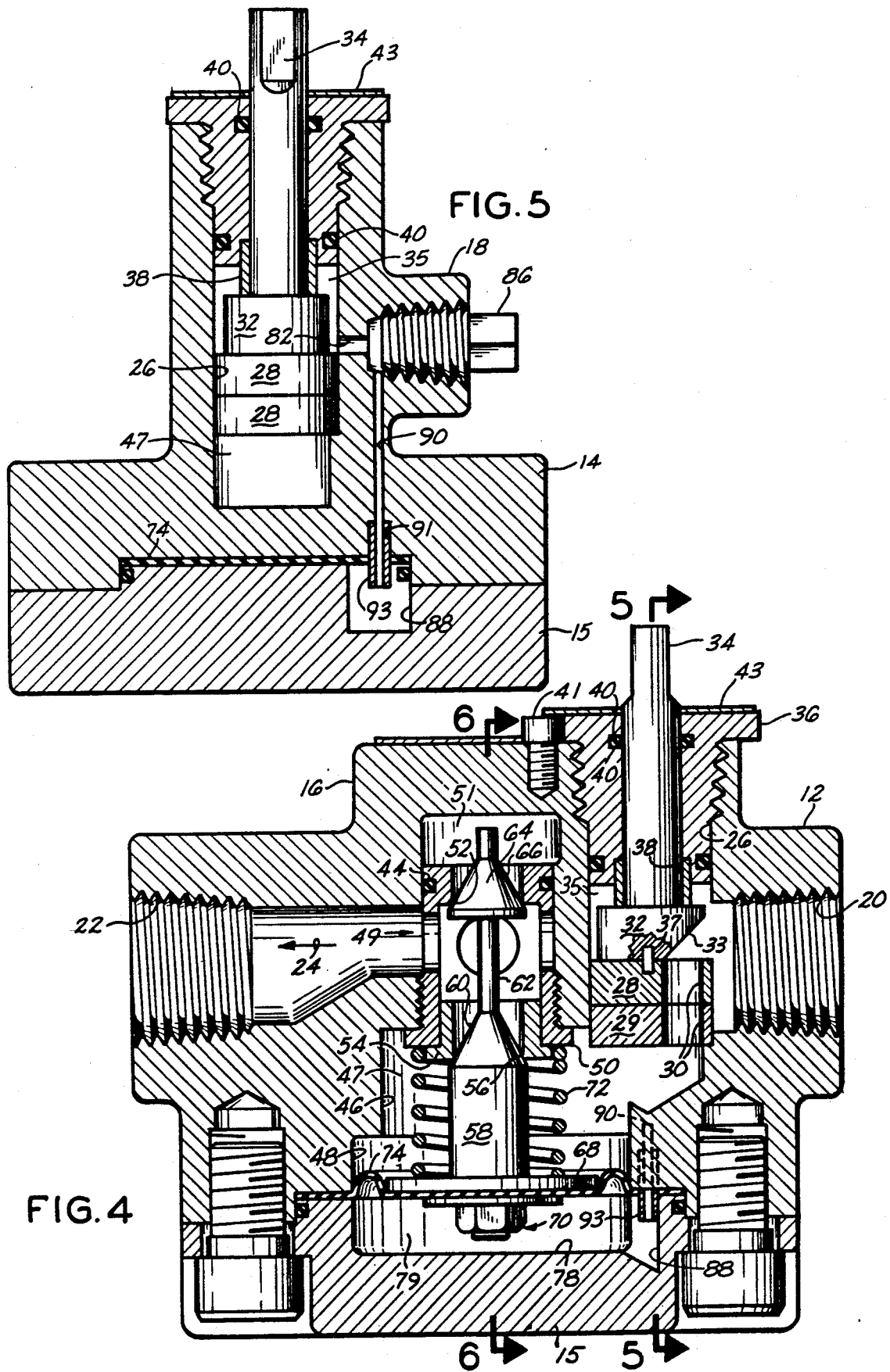

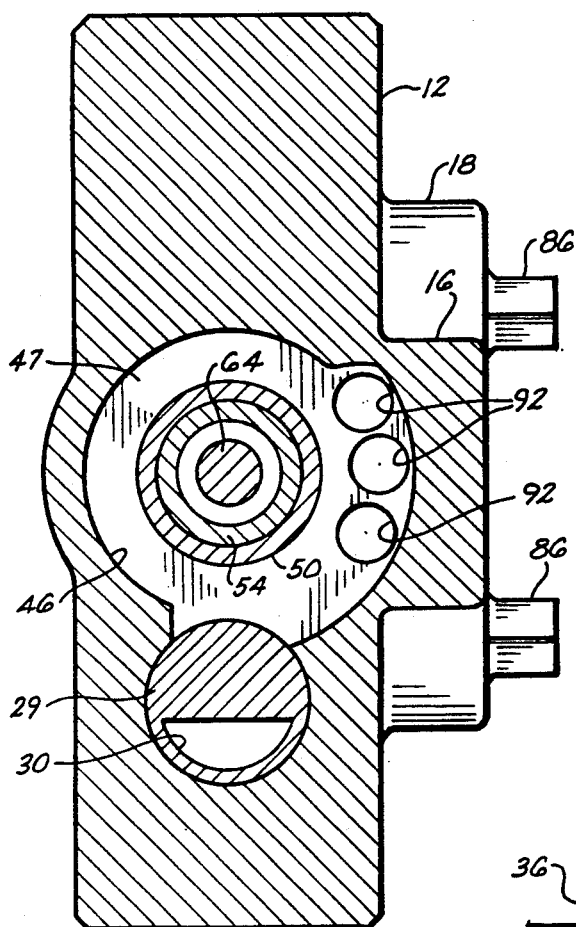
FIG. 7
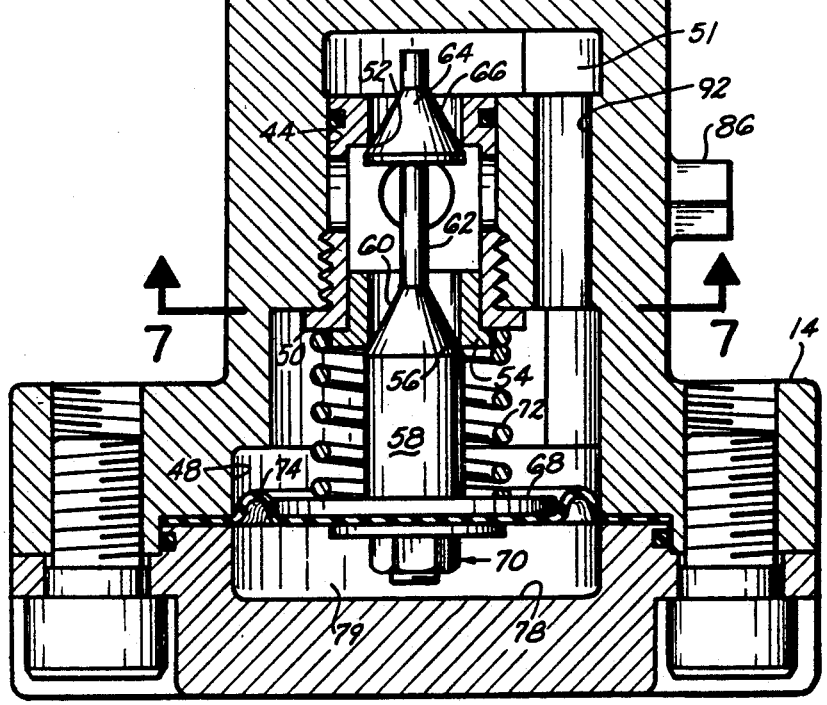
FIG. 8
FIG. 6

CONSTANT FLOW ORIFICE VALVE

BACKGROUND OF THE INVENTION

1. Field of the invention

This invention relates to fluid control and more particularly to a disc orifice valve providing a constant flow of fluid through a conductor.

2. Description of the prior art

Conventional pipeline valves when used for controlling fluid flow in a fluid conductor subject to variations in fluid pressure are not generally capable of controlling the volume of fluid at a predetermined level during fluid pressure fluctuations. Some industrial applications require a constant volume of fluid flow regardless of pressure variations in the fluid line. This invention provides a combination orifice and diaphragm operated poppet valve which achieves this function.

SUMMARY OF THE INVENTION

A valve body provided with axially aligned inlet and outlet ports defining a flow passageway therethrough is provided with disc orifices in the inlet end of the passageway for regulating the volume of fluid entering the valve. A central chamber in the valve body, extending transversely of the flow passageway, supports a poppet valve secured at one end of the valve body chamber by a fluid pressure responsive balanced diaphragm, spring biased toward a poppet valve open position. Fluid bypass bores in the valve body parallel with the poppet valve equalize fluid pressure on opposite ends of the poppet valve and both surfaces of the diaphragm.

The principal object of this invention is to provide an orifice valve maintaining a constant volume of fluid flowing through a high pressure fluid passageway and in which the valve body includes a fluid pressure balanced diaphragm responsive poppet valve biased open by spring pressure in accordance with the volume of fluid flow through disc orifices.

BRIEF DESCRIPTION OF THE DRAWINGS

FIG. 4 is a vertical cross sectional view, to an enlarged scale, taken substantially along the line 4—4 of FIG. 1;

FIGS. 5 and 6 are vertical cross sectional views, taken substantially along the lines 5—5 and 6—6, respectively, of FIG. 4;

FIG. 7 is a horizontal sectional view, taken substantially along the line 7—7 of FIG. 6; and, FIG. 8 is an exploded perspective view of the disc rotating fluid volume control stem, per se.

DESCRIPTION OF THE PREFERRED EMBODIMENTS

Figure 1:
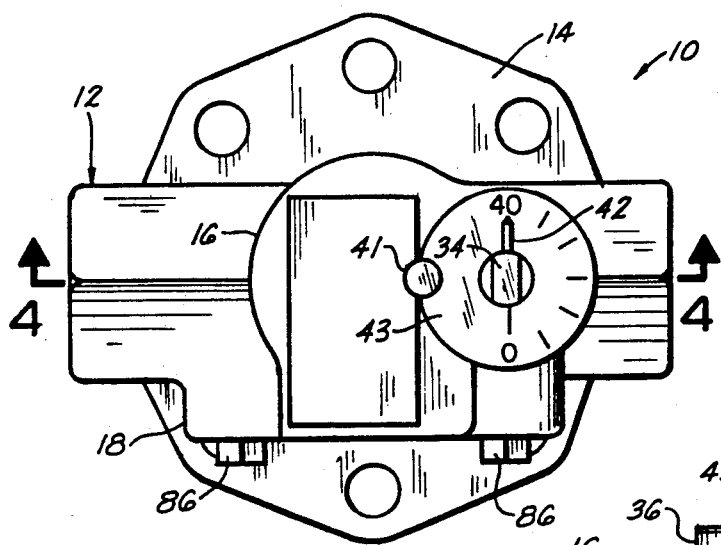
FIG. 1 is a top view of the valve.
Figure 3:
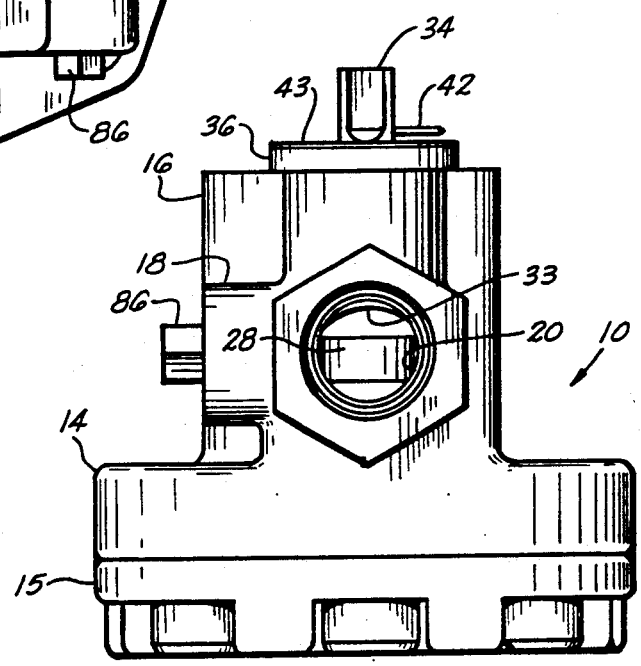
FIG. 3 is an end elevational view.
Figure 2:
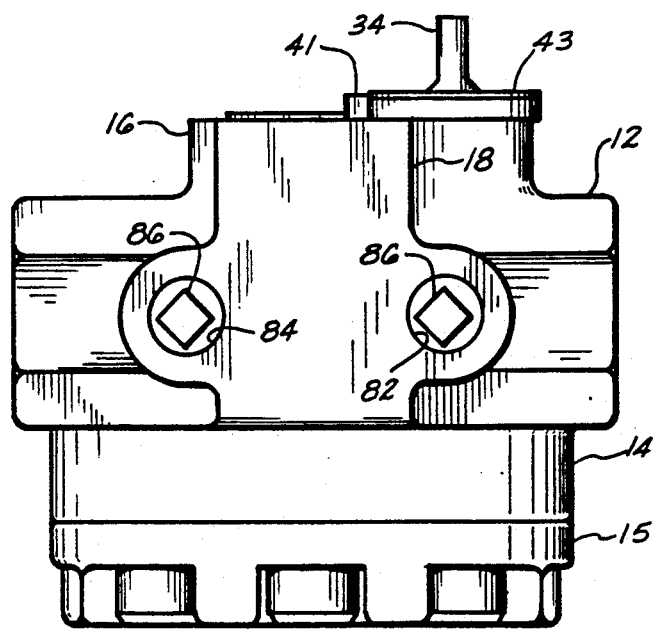
FIG. 2 is a side elevational view.

Like characters of reference designate like parts in those figures of the drawings in which they occur.

In the drawings:

The reference numeral 10 indicates the valve as a whole comprising a body having an elongated hexagonal horizontally disposed portion 12, as viewed in the drawings, supported by an integral flanged base 14 and bolt connected diaphragm plate 15 and further characterized by an upstanding generally cylindrical portion 16 having a lateral extension 18.

The body portion 12 is drilled from each end and threaded to form an inlet port 20, an outlet port 22 and define downstream fluid a passageway 24.

The body top 16 is vertically drilled, as viewed in the drawings, as at 26 transversely intersecting the inlet port 20 for receiving a pair of superposed discs 28 and 29, each having a radially disposed aperture or orifice 30 therethrough disposed in aligned relation.

A generally cylindrical flow control stem 34 having a cylindrical base end 32, diametrically smaller than the discs 28 and 29 defines an annulus 35 with the wall of the bore 26 communicating with the inlet port 20. The stem base 32 overlies the uppermost disc 28 and is secured thereto by pins 37 entering cooperating vertically aligned confronting sockets formed in the adjacent bottom and top surfaces, respectively, of the stem base 32 and uppermost disc 28 for mating and mismating the disc orifices 30 by angular rotation of the stem at its end portion projecting above the upper limit of the valve top 16. The perimeter of the bottom disc 29 is press fitted in the bore 26. The stem 34 is surrounded by a stem bushing 36 threadedly received by the first bore 26 and impinging a sleeve thrust bearing 38 against the upper surface of the stem base 32. O-rings 40 seal the stem bushing 36 with the stem 34 and bore 26, respectively. A screw 41 secures the bushing in the bore 26. An indicator 42 secured to the stem 34 registers the valve open position of the disc 28 relative to the disc 29 by indicia on a top plate 43.

A sector of the depending wall portion of the stem base 32 is angularly cut away (FIG. 8) extending through substantially 160° of its depending perimeter to form an inclined or beveled surface, as at 33, and permit disc orifice 30 full fluid flow from the inlet port 20 through the orifices 30 when the stem base 32 is in orifice fully mated position (FIG. 4).

When rotated 180°, in a valve closing direction, by the stem 34 the disc 28 completely blocks fluid flow through the disc orifices 30, thus closing the fluid passageway 24.

The valve body is transversely bored from its flange base 14 to form a second transverse bore 44, intersecting the fluid passageway 24 downstream from the first transverse bore 26 and is counterbored, as at 46 and 48, to form a fluid chamber 47 communicating with the inward limit of the bore 26.

Poppet valve means 49 includes a transversely apertured sleeve-like cage 50 axially received by the bore 44 and threadedly engaged and O-ring sealed therewith to define a chamber 51 at the inner end of the bore 44. The cage provides an upper downwardly facing valve seat 52. A flanged end sleeve 54 is press fitted in the bore of the cage 50 opposite the valve seat 52 to form a second or lower downwardly facing valve seat 56.

Poppet valve means including a cylindrical lower valve 58 having a valve seat 60, seating on the valve seat 56 is provided with an axial cage rod 62 coaxially supporting an upper valve 64 having a valve seat 66 seating on the upper valve seat 52.

The end of the valve 58, opposite its seat 60, is secured to a diaphragm plate 68 by a washer and nut 70. A helical spring 72 is interposed between the cage and the diaphragm plate 68. A diaphragm 74 is interposed between the diaphragm plate 68 and washer and nut 70. The flange plate 15 impinges a peripheral portion of the diaphragm against the base 14. The flange plate 15 is provided with a central recess 78 forming a diaphragm chamber 79.

The valve body lateral projection 18 is horizontally drilled and threaded as at 82 and 84 intersecting the inlet and outlet ports 20 and 22, respectively, (FIG. 5) and closed by plugs 86. The bore 82 communicates with the annular space 35 adjacent the periphery of the stem base 32.

A portion of the periphery of the wall forming the diaphragm chamber 79 formed by the recess 78 is provided with a wall recess as at 88. The valve body is vertically bored and counterbored from the wall recess through a peripheral portion of the diaphragm, as at 90 and 91, (FIG. 5), to communicate with the inner end portion of the threaded bore 82 inwardly of the plug 86. A sleeve 93 in the counterbore 91 transversely extends through the diaphragm 74 to provide, with the bore 90, fluid pressure communication between the inlet port 20 and the valve diaphragm chamber 79 against the diaphragm 74 opposite the poppet valve means 49.

Referring also to FIGS. 6 and 7, the inward limit of the counterbore 46 is vertically bored as at 92 to provide bypass bore communication between the counterbore 46 and the chamber 51 at the inward end of the transverse bore 44 above the poppet valve means 49.

Operation

In operation, the valve 10 is interposed in a fluid line, not shown, with the disc orifices mismated. The flow volume control stem base 32, normally in disc orifice closed position, is rotated to position its indicator 42 at a desired value on the flow rate dial 43 to at least partially mate the disc orifices 30 for fluid flow therethrough.

Fluid from the inlet port 20 enters the chamber 47 while simultaneously fluid pressure enters the diaphragm chamber 79 through the bores 82 and 90, thus balancing fluid pressure on opposite surfaces of the diaphragm 74. Also, fluid simultaneously enters the poppet valve bore chamber 51 through the bypass bores 92, extending between the chambers 47 and 51, to apply pressure against the valve surfaces 60 and 66 for a fluid pressure balanced condition of the poppet valve means.

The poppet valves 58 and 64 are biased open in accordance with the fluid flow volume permitted by the disc orifices 30 by the spring 72 moving the poppet valves toward the diaphragm chamber 79 permitting fluid flow through the passageway 24.

The valve 10 thus quickly reaches a state of equilibrium in accordance with the pressure and volume of fluid flowing therethrough which minimizes any fluctuation in the fluid volume by pressure surges at the upstream or inlet port 20 of the valve.

Obviously the invention is susceptible to changes or alterations without defeating its practicability. Therefore, I do not wish to be confined to the preferred embodiment shown in the drawings and described herein.

I claim:

1. A constant flow disc valve, comprising:
    a valve body having an upstream fluid inlet port and a downstream outlet port forming a downstream fluid passageway,
        said body have a first transverse bore intersecting the inlet port and having a second transverse bore intersecting the fluid passageway and counterbored for communication with the first bore for forming fluid chambers on opposite sides of the fluid passageway,
        said body a having a bypass bore providing communication between the fluid chambers;
    disc orifice means including a rotatable disc in the first bore for controlling the volume of fluid entering the counterbores;
    a diaphragm dividing the counterbore; and,
    poppet valve means in the second bore and secured to said diaphragm,
        said body having other by pass bores providing fluid communication between the inlet port and the diaphragm opposite the poppet valve means for maintaining a constant volume of fluid flow through the valve body.

2. The disc valve according to claim 1 in which the diaphragm and poppet valve means includes:
    a diaphragm transversely interposed in the outer end portion of the second bore;
    diaphragm plate means for closing the second bore and impinging a peripheral portion of the diaphragm against said body;
    cage means having valve seats in the second bore;
    a poppet valve secured to the diaphragm for longitudinal reciprocating movement toward and away from the valve seats; and,
    spring means for biasing said poppet valve open.

3. The disc valve according to claim 2 in which said disc means includes:
    a nonrotatable first disc having a through orifice transversely anchored in the first bore; and,
    rotatable disc means for covering and uncovering the first disk orifice.

4. The disc valve according to claim 3 in which the rotatable disc means includes:
    a second disc having a bottom surface superposed on the first disc and having a sector, substantially equal in transverse area with the transverse area of the first disc orifice, of its bottom surface removed;
    a stem on said second disc projecting outwardly of said body for rotating said second disc and,
    a stem bushing surrounding said stem.

5. The disc valve according to claim 4 in which said valve body is provided with an upstream lateral bore intersecting the inlet port; and,
    a plug normally closing the outer end portion of the lateral bore.

6. The disc valve according to claim 1 in which said valve body is provided with an upstream lateral bore intersecting the inlet port; and,
    a plug normally closing the outer end portion of the lateral bore.

* * * * *